(12) United States Patent
Aksyuk et al.

(10) Patent No.: US 6,600,851 B2
(45) Date of Patent: Jul. 29, 2003

(54) ELECTROSTATICALLY ACTUATED MICRO-ELECTRO-MECHANICAL SYSTEM (MEMS) DEVICE

(75) Inventors: Vladimir Anatolyevich Aksyuk, Piscataway, NJ (US); Cristian A Bolle, North Plainfield, NJ (US); Flavio Pardo, New Providence, NJ (US)

(73) Assignees: Agere Systems Inc., Allentown, PA (US); Lucent Technologies Inc., Murray Hill, NJ (US)

( * ) Notice: Subject to any disclaimer, the term of this patent is extended or adjusted under 35 U.S.C. 154(b) by 40 days.

(21) Appl. No.: 09/755,727

(22) Filed: Jan. 5, 2001

(65) Prior Publication Data

US 2003/0103717 A1 Jun. 5, 2003

(51) Int. Cl.[7] .................................................. G02B 6/26
(52) U.S. Cl. ............................. 385/18; 385/16; 385/25; 359/224
(58) Field of Search .............................. 385/18, 17, 16, 385/25; 359/223, 224

(56) References Cited

U.S. PATENT DOCUMENTS

| | | | | |
|---|---|---|---|---|
| 4,317,611 A | * | 3/1982 | Petersen | 359/214 |
| 5,142,405 A | * | 8/1992 | Hornbeck | 359/198 |
| 5,552,924 A | * | 9/1996 | Tregilgas | 359/223 |
| 5,920,417 A | | 7/1999 | Johnson | 359/223 |
| 5,966,230 A | * | 10/1999 | Swartz et al. | 235/462.32 |
| 6,154,302 A | * | 11/2000 | Yagi et al. | 359/198 |
| 6,201,631 B1 | * | 3/2001 | Greywall | 335/222 |
| 2003/0011863 A1 | * | 1/2003 | Muller | 359/224 |

OTHER PUBLICATIONS

Chen et al., *IEEE*, "A Low Voltage Micromachined Optical Switch By Stress–Induced Bending", pp. 424–428.
V.A. Aksyuk, "Micro Electro Mechanical Systems For Experimental Physics And Optical Telecommunications", May 1999.
Neilson et al., "Fully Provisioned 112 ×112 Micro–Mechanical Optical Crossconnect With 35.8Tb/s Demonstrated Capacity", Mar. 2000.

* cited by examiner

*Primary Examiner*—Rodney Bovernick
*Assistant Examiner*—Sung Pak
(74) *Attorney, Agent, or Firm*—Richard J. Botos

(57) ABSTRACT

A micro-electro-mechanical system (MEMS) actuator device is disclosed. The MEMS actuator device has an actuated element that is rotatably connected to a support structure via torsional members. The torsional members provide a restoring force to keep the actuated element planar to the surface of an underlying substrate. The surface of the substrate has electrodes formed thereon. The electrodes are adapted to receive an electrical potential. When an electrical potential is applied to certain of the electrodes, an electrostatic force is generated which causes the actuated element to rotate out of plane. The electrodes have three components. At least a portion of two of the components is within the tilting area of the actuated element. The third is outside the tilting area of the actuated element. The tilting area is defined as the surface area of the actuated element as projected onto the underlying substrate.

14 Claims, 4 Drawing Sheets

ELECTROSTATICALLY ACTUATED MICRO-ELECTRO-MECHANICAL SYSTEM (MEMS) DEVICE

BACKGROUND OF THE INVENTION

1. Technical Field

The present invention relates to electrostatically actuated Micro-Electro-Mechanical System (MEMS) devices and, more specifically, to optical cross-connects with electrostatically actuated MEMS devices.

2. Art Background

Electrostatically actuated MEMS devices have been proposed for a variety of applications. In one application of such devices, movable micro-machined mirrors are used as a switching element to direct an input optical signal to a desired output. The movement of the micro-machined mirrors is accomplished by electrostatic actuation. One example of a simple electrostatically actuated fiber optic switch is described in Chen, Richard T., et. al., "A Low Voltage Micromachined Optical Switch by Stress-Induced Bending," *IEEE* (1999). The electrostatically actuated fiber optic switches described in Chen et al. have individual hinged mirrors attached to the end of a polycrystalline silicon (polysilicon) cantilever beam. The cantilever beam is coated with a stressed layer of chromium and gold on its top surface. During operation, a voltage is applied to the cantilever beam, attracting it to the grounded substrate. The mirror is moved in and out of the path of light, redirecting the light to a given, preset output.

One of the disadvantages of the switch described in Chen et al. is that it can accommodate only a limited number of input and output signals. The switch described by Chen et al. has two input fibers and two output fibers. Because of the limited number of inputs and outputs that can be handled by the switch described in Chen et al., that switch is referred to as a low-density switch.

One of the reasons for the low density of a switch architecture that uses the switch elements described in Chen et al. is that the number of switching elements in such architecture is proportional to the square of the number of input/output ports. Thus, a switch with a large number of ports is prohibitively large in size. Also, the light path length and corresponding insertion loss becomes prohibitively large for a large switch that employs such an architecture.

A higher density MEMS optical crossconnect is described in Neilson, David T., et al., "Fully Provisioned 112×112 Micro-Mechanical Optical Crossconnect With 35.8 Tb/s Demonstrated Capacity," *Optical Fiber Communication Conference* (Mar. 8, 2000). In the crossconnect described in Neilson et al. a 16×16 array of mirrors is formed on a substrate. The mirrors are raised above the substrate surface by a hinged supporting structure. The hinged supporting structure is attached to the substrate. An electrostatic force moves the mirrors. Supplying an electrical potential to electrodes disposed under the mirrors generates the electrostatic force. In this arrangement, mirrors are tilted to a desired degree to direct the light incident thereon to a desired output in the array of outputs. For a fully provisioned cross connect, only one mirror per input and one mirror per output are required (i.e. the number of ports is N and the number of mirrors is 2N). Thus, in this architecture, the number of mirrors scales with N, not $N^2$ (as in the architecture that uses the Chen et al. elements).

In the crossconnect device described in Neilson et al., an individual mirror element is affixed to a movable supporting structure (i.e. a gimbal) via torsional elements such as springs. The gimbal is coupled to a frame, also via torsional elements. Two torsional elements couple the mirror to the gimbal and the two mirror torsional elements are positioned on opposing sides of the mirror element and define and axis for mirror rotation. Similarly, two torsional elements couple the gimbal to the frame and the two gimbal torsional elements are positioned on opposing sides of the gimbal and define an axis for gimbal rotation. The mirror's axis of rotation is orthogonal to the gimbal's axis of rotation. In their relaxed state, these torsional elements keep the movable mirror and gimbal in a plane parallel to the plane of the substrate surface.

Electrodes are positioned directly under the mirror and gimbal. The electrodes are configured to be capable of rotating the mirror element or gimbal in either direction about its axis. The mirror element or gimbal rotates in response to the electrostatic attractive force between the mirror element or gimbal and the fixed electrodes. In an equilibrium position at a given angle of the mirror (zero degrees is the angle in its relaxed, non-tilted state), the attractive force is balanced by the restoring force of the torsional elements. The degree of rotation depends upon the amount of voltage applied to the electrodes. Thus, controlling the amount of voltage applied to the electrode controls the angle of tilt.

The cross-connect described in Neilson et al. is configured so that any of 112 inputs can be connected to any of 112 outputs. In order to provide this number of interconnections, the interconnect (i.e. the mirror array) must be able to direct the input signal to the desired output port. Controlling the tilt angle of the mirror in order to direct an input signal to the desired output port is of great importance. Consequently, the mirror must be tilted with precision. As previously noted, the equilibrium position of the mirror (the electrostatic force between the electrodes and the mirror is balanced by the restoring force of the torsional elements) defines the tilt angle of the mirror. Thus, mechanisms for accurately and precisely controlling the tilt of the mirror are desired.

SUMMARY OF THE INVENTION

The present invention is directed to an electrostatically actuated MEMS device. The MEMS actuator device has an actuated element (e.g. an optical element such as a mirror). The actuated element is attached to a supporting structure via torsional elements that define an axis of rotation for the optical element. Typically, two torsional elements affixed to opposing sides of the optical element are provided for this purpose. The supporting structure is supported on a substrate.

In certain embodiments, the supporting structure is moveably attached to a supporting substrate. One example of a movable supporting structure is a gimbal ring. The gimballed configuration provides the actuated element with a second axis of rotation and, consequently, a greater number of mirror positions. The substrate surface underlying the actuated element/support structure has fixed electrodes formed thereon. The combination of electrodes and the actuated element/supporting structure form the electrostatic actuator. The actuated element/supporting structure moves in response to a difference in electrical potential between it and the underlying electrode.

The electrode is configured to generate an electrostatic force between the actuated element and the underlying electrode. The electrostatic force causes the actuated element to rotate about the axis defined by the torsional elements. In one embodiment, a pair of electrodes is provided to effect rotation of the actuated element in both a clockwise and a counter clockwise direction.

The electrode has three components. The first component is the electrode that causes rotation about the axis by providing an electrostatic attractive force between the actuated element and the electrode. The second component is a neutral electrode. As used herein, a neutral electrode is an electrode that is neutral with respect to the actuated element. That is, the neutral electrode is at the same voltage or potential as the actuated element. The third component is configured to compensate for the nonlinear nature of the electrostatic force that causes the actuated element to rotate.

The electrostatic force is nonlinear because, for a given applied voltage, the force increases as the actuated element rotates toward the electrode. At some fixed applied voltage (i.e. a voltage larger than the voltage required to move the optical element) and corresponding degree of rotation (measured as the angle of tilt of the optical element from the planar state), electrostatic force increases at a faster rate than the restoring force of the torsional elements. At this point, the degree of tilt is no longer controllable. Thus, the actuated element is only controllably rotated to some finite angle, after which the rotation becomes uncontrolled.

The third component of the electrode compensates for this nonlinear relationship between the electrostatic force and the restoring force of the torsional elements. Thus, the third component of the electrode extends the range of angles through which the actuated element is controllably rotated (compared to an optical element rotated using a one or a two component electrode).

The configuration of the three component electrode of the present invention is described in terms of its placement in relation to a tilting area defined by the actuated element. For purposes of the present invention, the tilting area of the actuated element is the surface area of the actuated element as projected onto the surface underlying the actuated element. For a given element configuration, the tilting area changes as a function of tilt angle. Typically, tilting area is larger when the actuated element is approximately parallel to the underlying surface (i.e. the tilt angle is about zero degrees) and smaller as the actuated element tilts toward the underlying surface (i.e. the tilt angle gets larger).

For purposes of the present invention, an electrode component is inside the tilting area if at least some portion of that component underlies the actuated element throughout the entire range of tilt. Conversely, an electrode component is outside the tilting area if the entire electrode component lies outside the tilting area through at least some portion of the range of tilt. Consequently, the first and second electrode components are within the tilting area because at least a portion of both the first and second components underlie the optical element throughout the entire range of tilt. The third electrode component is outside the tilting area because, through at least some portion of the range of tilt, the third electrode component is completely outside the tilting area of the optical element. It is advantageous if the third component is completely outside the tilting area of the optical element throughout the entire range of tilt.

The position of the electrode component relative to the tilting area of the actuated element is significant because the position of the electrode component defines the location of the electrostatic field generated by the electrode component. Specifically, the third component of the electrode increases the electrostatic force for a given voltage (compared the force/voltage relationship for an electrode without the third component) when the electrostatic field generated by the third element is higher below the actuated element than above the actuated element. In the context of the present invention, the angles in the range at which the electrostatic field is predominantly below the actuated element are referred to as the small angles of tilt. The third component decreases the electrostatic force for a given voltage (again compared to the force/voltage relationship for an electrode without the third component) when the electrostatic field generated by the third component is higher above the actuated element than below the actuated element. Thus, the bottom side of the actuated element is shielded from at least a portion of the electrostatic field generated by the third component under these conditions.

In the context of the present invention, the angles in the range of angles at which the bottom of the actuated element is shielded from the electrostatic field and the top of the mirror is exposed to the electrostatic field are referred to as the large angles of tilt. For purposes of the present invention, the tilting angle range is zero degrees (defined as the tilt angle of the mirror in its unactuated state) through the range of angles at which rotation is controllable (i.e. the maximum angle of tilt). Thus, the range of angles in which rotation is controlled is extended compared to an actuator having an electrode that is configured to have at least a portion of all electrode components within the tilting area of the optical device.

DETAILED DESCRIPTION

Figure 1:
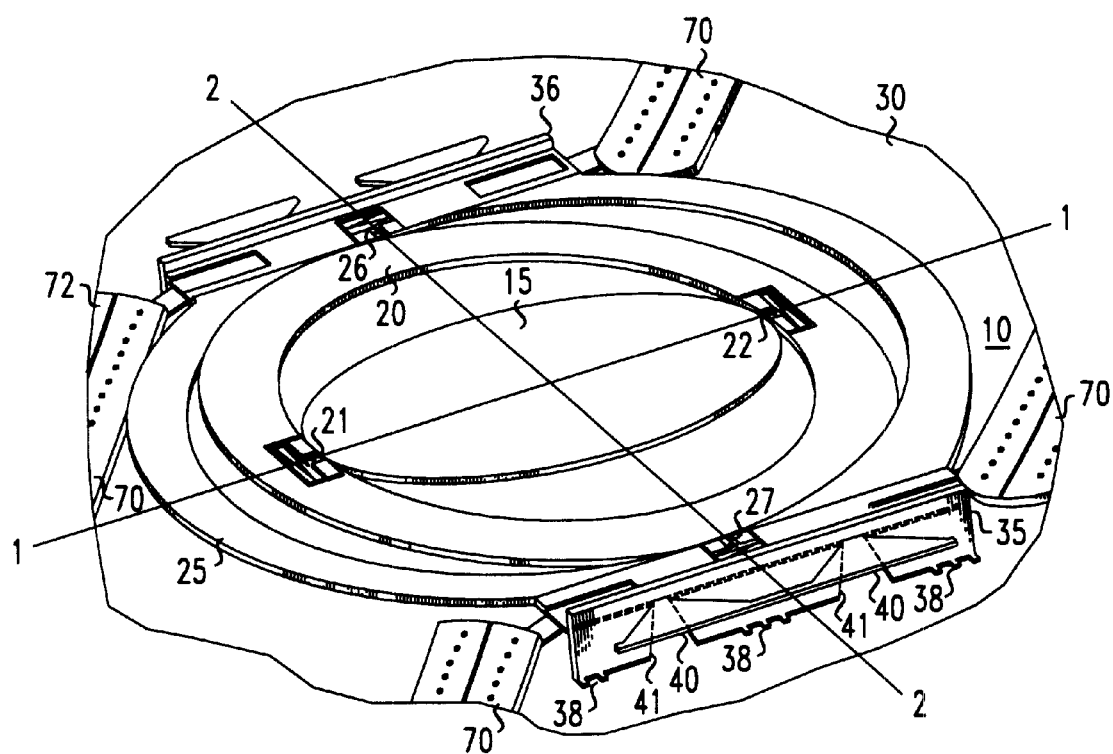
FIG. 1 is a perspective view of an optical element that is electrostatically actuated.

The present invention is directed to an electrostatic MEMS actuator. The electrostatically actuated MEMS device of the present invention is described herein in terms of an optical element and an associated electrode. The optical element is configured to rotate in response to the application of an electrostatic force. The associated electrode is configured to generate the electrostatic force that causes the optical element to rotate.

One example of a rotatable MEMS optical element is described with reference to FIG. 1. The device 10 has a reflector 15 that is rotatably attached to a support ring 20. The reflector 15 is rotatably attached via spring elements 21 and 22. Spring elements 21 and 22 define the axis of rotation for reflector 15.

The support ring 20 is rotatably attached to a frame 25. The support ring 20 is rotatably attached to frame 25 via spring elements 26 and 27. Spring elements 26 and 27 define the axis of rotation for support ring 20. Thus, support ring 20 is a gimbal that provides a second axis of rotation for reflector 15.

The optical device is formed on a substrate surface 30. The reflector 15, gimbal 20 and frame 25 are raised above the surface of substrate 30. Hinged sidewalls 35 and 36 are provided for this purpose. Hinges 38 are provided to permit the sidewalls 35 and 36 to pivot from a first position (not shown) to the position illustrated in FIG. 1.

The sidewalls 35 and 36 have v-shaped notches 41. The sidewalls 35 and 36 are coupled to frame 25. The frame has tapered sections 40. The relative position of the v-shaped notch 41 and the tapered section 40 is such that the v-shaped notch captures the tapered section 40. Thus, as the sidewalls 35 and 36 pivot to their upright position, and the frame 25 rises to its final position with support ring 20 and reflector 15 above the substrate surface, the frame 25 is fixed in the final position by sidewalls 35 and 36.

Actuators 70 are provided to raise the frame 25 above the surface of the substrate 30. The actuators 70 are affixed to the substrate 30 at one end (not shown). The other end 72 of actuator 70 is not affixed to the substrate and deflects up from the substrate in response to an actuating force (e.g., residual stress in the layered structure). Such actuators are well known to one skilled in the art and not described in detail herein. Suitable actuators are described in commonly assigned U.S. Ser. No. 09/390,157 filed Sep. 3, 1999, which is incorporated by reference herein.

The device depicted in FIG. 1 is fabricated using microfabrication techniques. Microfabrication techniques for forming MEMS devices are well known to one skilled in the art. One such microfabrication technique is known as surface-micromachining. In surface-micromachining, a member is delineated and defined in a layer or layers of material formed on a substrate. In one example of surface-micromachining, the member is in hinged connection with a support layer. The technique is described in Pister et al., "Microfabricated Hinges," Vol. 33, Sensors and Actuators, pp. 249–256 (1997). The member is then released from the substrate by removing a sacrificial layer (typically silicon dioxide) that is between the member and the substrate. Since the member is in hinged connection with the support layer, it is then capable of being pivoted out of the plane of the support layer after release. Thus, such members, upon release, are pivoted out of the plane of the layer in which they are fabricated to assemble three-dimensional structures.

With surface-micromachining, higher resolution (i.e. a more precise delineation and definition) of the members that form the three-dimensional structure is more readily achieved than if the three dimensional structure was fabricated using a three-dimensional fabrication process. The higher resolution derives from the fact that high vertical resolution (i.e. resolution in the direction normal to the substrate surface) is more difficult to obtain than planar resolution (i.e. resolution in the plane of the layer). Surface-micromachining combines the advantage of high planar resolution of the members with the ability to assemble three-dimensional structures from the members after they are released from the substrate.

One example of the surface micromachining approach is also known as the Multi-User MEMS Process (MUMPs). The MUMPs process is offered by a commercial MEMS foundry, Cronos JDS Uniphase. The MUMPs process is described generally in Aksyuk, V. "Micro Electro Mechanical Systems for Experimental Physics and Optical Telecommunication," Ph.D thesis. New Brunswick, N.J.: Rutgers University (1999), which is hereby incorporated by reference.

Referring to FIG. 1, reflector 15 is illustrated as tilted about its axis 1—1. Support ring 20 is depicted as tilted about its axis 2—2. Such tilting is accomplished by applying an electrostatic force to the reflector 15, support ring 20 or both. Specifically, the support ring 20 and reflector 15 are held in space via torsional elements illustrated as springs 21, 22, 26 and 27, which are linear elastic suspension members. Springs 21, 22, 26 and 27 are configured to allow the reflector 15 and supporting ring 20 to move with one or more degrees of freedom in relation to the fixed frame 25. Springs 21, 22, 26 and 27 are also configured to provide a restoring force. The springs are configured to favor rotational movement of the reflector over translational movement. In the context of the present invention, translational movement is movement in the X, Y and Z directions. Rotational movement is rotation about the axis defined by the springs. Examples of suitable configurations for the torsional elements include a serpentine configuration or a straight beam with a rectangular cross-section. An advantageous configuration resists displacement in the z direction and provides the desired rotational stiffness about the axis of the torsional element.

Figure 2:
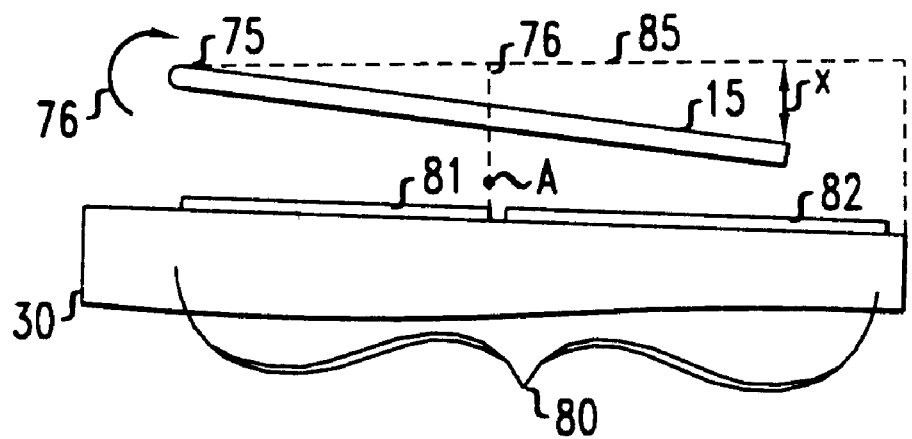
FIG. 2 is a cutaway side-view schematic of a portion of the optical element in FIG. 1 along line 2—2 that is electrostatically actuated by a two-component electrode.

One skilled in the art is able to select a suitable configuration for the springs based on these considerations. A prior art electrode structure is illustrated in FIG. 2. FIG. 2 is a cutaway view of one-half of the reflector 15 along line 2—2 in FIG. 1. The one-half of the reflector 15 is the half from its axis of rotation to its perimeter along line 2—2. Line 1—1 is the axis of rotation of reflector 15. That axis of rotation is illustrated as point 75 in FIG. 2. Arrow 76 indicates the direction of the rotation.

The electrode 80 has two components, 81 and 82. The electrodes are conductive elements formed on substrate 30. The electrode component 81 is electrically connected to a voltage source (not shown). Electrode component 82 is neutral with respect to the reflector 15 (i.e. there is a zero potential difference between the electrode component 82 and reflector 15). Consequently, electrode component 82 and reflector 15 are either connected to a common voltage or to ground. A non-zero voltage is applied to electrode component 81 in order to rotate reflector 15. Because reflector 15 is also conductive, an electrostatic force is generated between reflector 15 and electrode component 81. The force produces a non-zero torque around the axis of rotation. In response to the electrostatic torque, reflector 15 rotates an angle a from its at-rest position (indicated by dashed line 85). For the reflector element 15 in its rotated, equilibrium position, the sum of the electrostatic torque and the restoring torque of the springs (21 and 22 in FIG. 1) is equal to zero. The electrostatic torque in this arrangement is a function of $\alpha$ for a given non-zero voltage.

Because of this relationship, there is a maximum angle $\alpha$ that the mirror can be rotated in a stable manner. Beyond that maximum distance, the reflector becomes unstable (i.e., its position cannot be controlled by controlling the applied voltage). For the configuration illustrated in FIG. 2, the maximum angle $\alpha$ is defined by the angle at which the reflector 44 crosses a point A that corresponds to about forty-four percent of the total distance from line 85 to the end of electrode 80. This line is illustrated as line 74 in FIG. 2.

Figure 3:
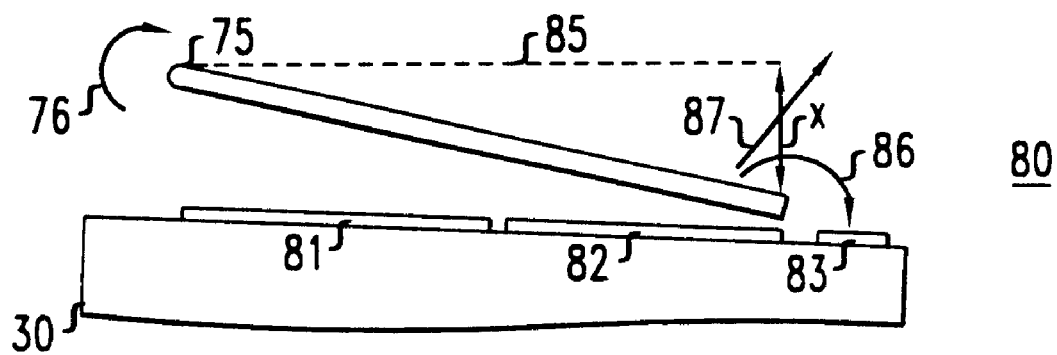
FIG. 3 is a side-view schematic of an optical element that is electrostatically actuated by the three-component electrode of the present invention.

One embodiment of an electrode that provides improved control over the reflector tilt (compared to the prior art electrode configuration illustrated in FIG. 2) is illustrated in FIG. 3. As in the prior art embodiment illustrated in FIG. 2, the electrode 80 has two components, 81 and 82. Component 81 is adapted to receive a voltage for generating an electrostatic force between component 81 and reflector 15. Component 82 is neutral with respect to the reflector 15. Note that electrode component 82 terminates proximate to the edge of reflector 15. Compare this with component 82 in FIG. 2, which extends beyond the edge of reflector 15.

Electrode 80 also has a third component 83. Component 83 is outside the tilting area of reflector 15. Third component 83, like component 81, is adapted to receive a voltage. Electrodes 81 and 83 can be electrically connected or be energized independently. The purpose of component 83 is twofold. As previously noted, in a first range of tilt angles (not shown), the electric field from the electrode is concentrated between the bottom side of the reflector and the electrode. The force is therefore attractive, regardless of the direction of the field, which is arbitrary (subject to the sign of the voltage). Thus, the electrode provides a pulling force (i.e. positive torque) when the tilting angle is small.

In a second range of tilt angles (i.e. the large tilt angles as previously defined and illustrated in FIG. 3) the electric field from component 83 produces an upward force on reflector 15. This upward force is illustrated by arrow 87. The upward force results from electrode component 83 being placed to the side of reflector 15 and the presence of electrode component 82. Without the presence of electrode component 82, the electrode component 83 would provide essentially zero torque on the reflector 15 because electrode component 83 is to the side of reflector 15. However, electrode component 82 screens the electric field from component 83 on the bottom side of reflector 15. Thus, the electric field from component 83 produces an upward force on the top surface of reflector 15 and a negative torque on the reflector 15. This electric field is illustrated as arrow 88.

Thus, at voltages that induce small tilt angles, an electrode component 83 decreases the required actuation voltage (compared to an electrode without a component 83). At voltages that induce large tilt angles, the electrode component 83 slows the rate at which the net downward electrostatic force increases with increasing tilt angle (compared to an electrode without a component 83). Thus, the electrode component 83 extends the tilting angle at which the reflector has a stable response (compared to an electrode without a component 83).

In the present invention, it is contemplated that the second electrode component will extend beyond the tilting area of the overlying element. One skilled in the art is aware that the electric field from the third electrode component is a function of the dimensions of the third electrode component as well as dimensions and positions of all other components and the overlying element. That is, given a third electrode component, the effect of the field on the overlying optical element will generally decrease with increasing distance between the third electrode component and the overlying optical element. Furthermore, if the third electrode component significantly extends into the tilting area of the overlying optical element, the field from the third electrode component has the potential to cause the overlying optical element to become unstable during tilt.

In an alternate embodiment, the second electrode component is under the first and third components. This configuration is easy to fabricate, since the substrates on which the electrodes are formed are typically conductive. Thus, the substrate surface itself can be the second electrode component.

Figure 4:
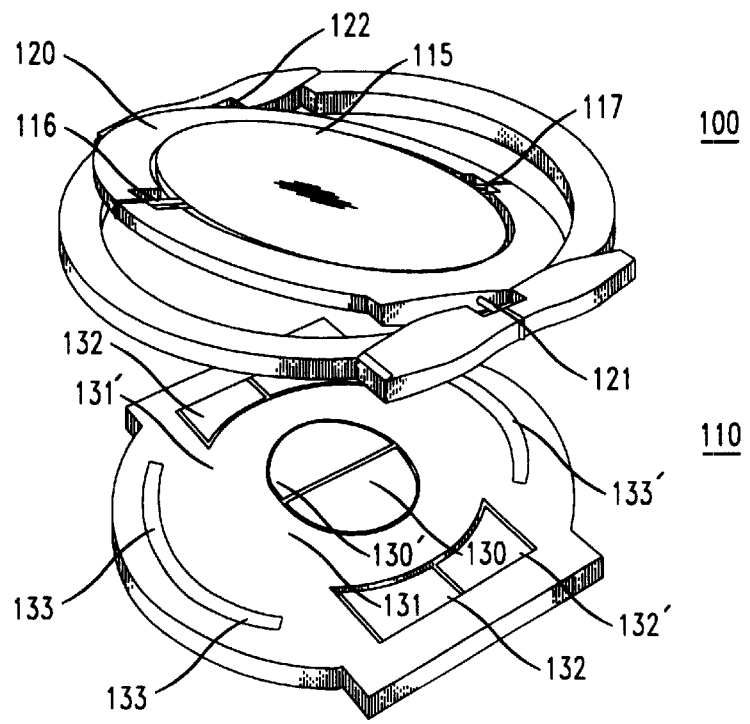
FIG. 4 is an exploded perspective view illustrating one embodiment of an electrostatic actuator of the present invention and an overlying optical device.

One embodiment of the present invention is described with reference to FIG. 4. In FIG. 4, a gimbaled mirror 100 is illustrated as overlying an electrode substrate 110. The mirror element 115 is round and has a diameter of 500 microns. The mirror element 115 is attached to gimbal 120 via linear elastic springs 116 and 117. The gimbal element 120 has an outer diameter of 660 microns. The gimbal element 120 is attached to frame 125 via linear elastic springs 120 and 121. Linear elastic elements 116 and 117 define the axis of rotation for mirror element 115. Linear elastic elements 121 and 122 define the axis of rotation for gimbal element 120.

The electrode substrate 110 is a distance of 50 microns below the gimbaled mirror 100 (in its planar state). There are two sets of electrodes; one set on each side of the axis of rotation defined by the linear elastic elements 121 and 122. The electrodes that rotate the gimbal are electrodes 132 and 132' and 133 and 133'. In order to rotate the gimbal in the manner described in FIG. 4, a voltage was applied to electrode 132' and 133'. The other electrodes (130, 130'; 131, 132 and 133) were neutral (0 volts). Note that electrode 133' is outside the tilting area of the gimbal element 120. Thus, in this embodiment, electrode 132' is the first electrode component, electrode 133' is the third electrode component and electrode 131 is the second electrode component.

Figure 5:
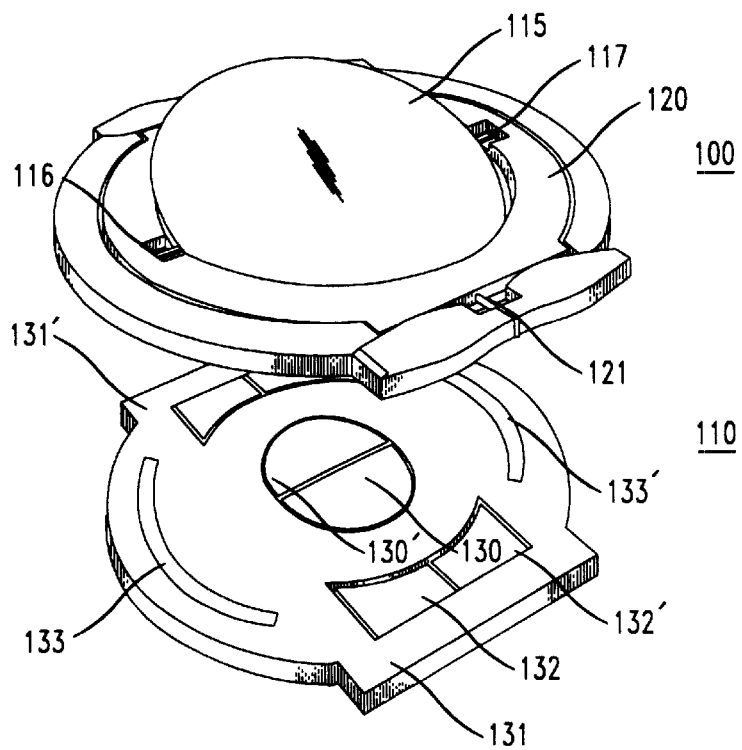
FIG. 5 is an exploded perspective view illustrating one embodiment of an electrostatic actuator of the present invention and an overlying optical device.

In order to rotate the mirror 115 in the manner illustrated in FIG. 5, a voltage is applied to electrodes 130, 132 and 132' and 0 volts is applied to all other electrodes. Note that electrodes 132 and 132' are outside the tilting area of the mirror 115. Thus, in this embodiment, electrode 130 is the first electrode component, electrode 131 is the second electrode component and electrodes 132 and 132' are the third electrode component.

Figure 6:
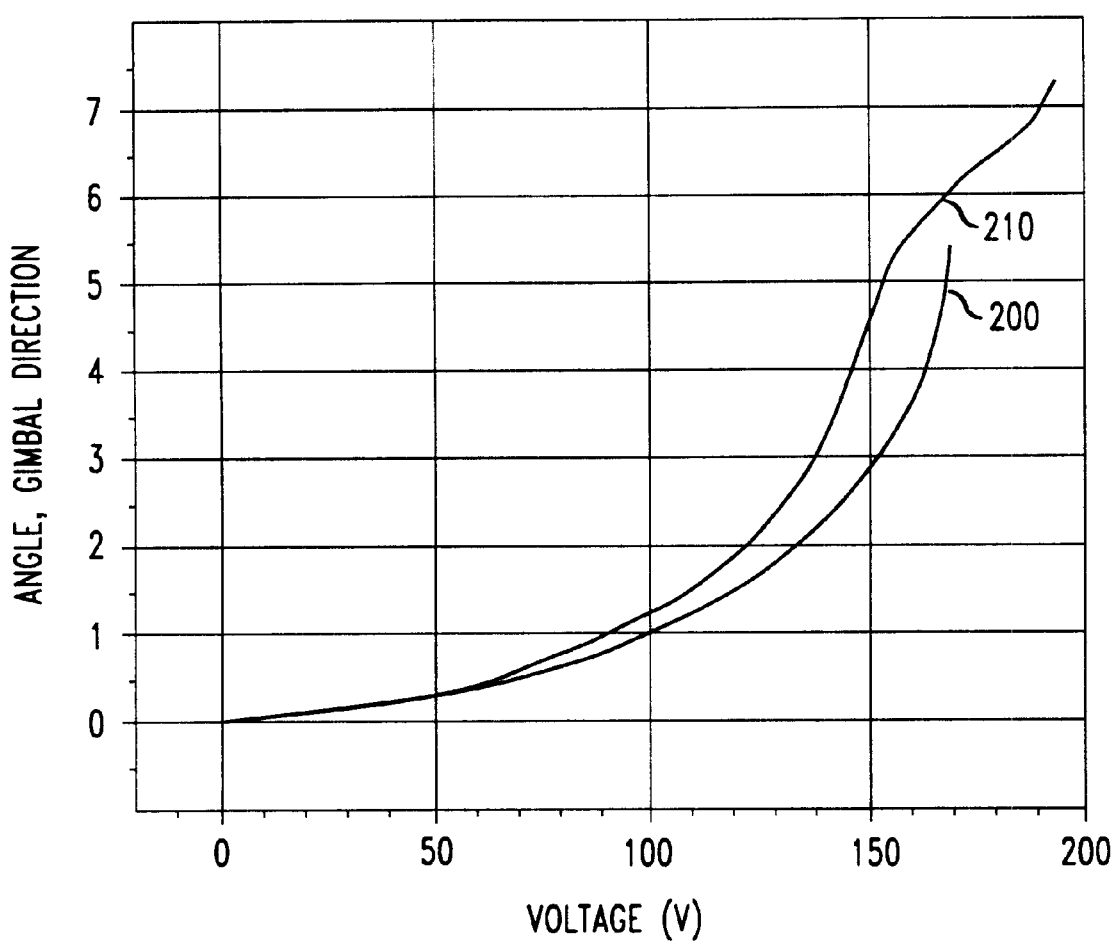
FIG. 6 illustrates the range of tilt angles as a function of voltage obtained using the actuator of the present invention.

The advantages of the present invention are appreciated by the comparison illustrated in FIG. 6. FIG. 6 illustrates the angle of rotation as a function of voltage for two actuator configurations. The first configuration has a two component electrode with a portion of both components within the tilt area. The relationship of tilt angle as a function of voltage is illustrated as line 200. The second configuration has a three component electrode of the present invention as illustrated in FIG. 5. The relationship of tilt angle as a function of voltage for the actuator of the present invention is illustrated as line 210. Comparing line 210 to line 200 clearly illustrates that the actuator of the present invention has a larger range of tilt angles than the actuator with the two component electrode.

The present invention has been described in terms of certain embodiments and examples. These embodiments and examples are provided to further describe the invention. One skilled in the art will appreciate that modifications to the embodiments and examples provided herein are possible without departing from the spirit and scope of the invention, which is defined in the appended claims. Specifically, while the electrostatic actuator has been described in terms of an optical switch, one skilled in the art will appreciate a variety of applications for the described actuator. For example, the actuator of the present invention is readily adapted for use as a sensor, wherein the actuated element is equipped with a probe tip.

What is claimed is:

1. A micro-electrical-mechanical system (MEMS) actuator comprising:
    an optical element rotatably coupled to a support structure wherein the support structure supports the optical element in a plane above the plane of a surface of an underlying substrate and wherein the portion of the surface of the underlying substrate directly underlying the optical element defines a tilting area on the underlying substrate; an electrode formed on the surface of the underlying substrate, wherein the electrode is configured to cause the optical element to rotate when an electrical potential is supplied to the electrode and wherein the electrode has at least three components, a first component and a third component are adapted to receive an actuating voltage and a second component is adapted to be at an electrical potential that is substantially the same as the electrical potential of the optical element, wherein the first and second components are at least partially within the tilting area of the optical element, the third component is completely outside the tilting area of the optical element for at least some portion of a range of rotation of the optical element and the second component is interposed between the first and third components.

2. The device of claim 1 wherein the optical device is a mirror.

3. The device of claim 1 wherein the second electrode and optical element are adapted to be at ground potential.

4. The device of claim 1 further comprising an array of input ports and an associated first array of MEMS actuators and an array of output ports and an associated second array of MEMS actuators, wherein the first array of MEMS actuators is adapted to controllably direct an optical signal incident on an optical element in the first array from an input port to the second array of MEMS actuators and the second array of MEMS actuators is configured to direct an optical signal incident on an optical element in the array to an output port.

5. The device of claim 1 wherein the optical element rotates through a range of angles, and the third electrode component is completely outside the tilting area of the optical element throughout the range of angles.

6. The device of claim 1 wherein the optical element is rotatably coupled to the support structure by at least two torsional members.

7. An optical crossconnect comprising:

an optical element supported by a substrate, wherein the optical element is suspended above the substrate by a plurality of torsional members affixed to corresponding support members, the optical element being adapted to rotate about an axis defined by the torsional elements in response to an actuating force provided by an electrode support on the substrate, wherein the electrode has at least three components, a first component being adapted to receive an actuating voltage, a second component being adapted to be placed at an electrical potential that is substantially the same as an electrical potential of the optical element and a third component that is adapted to receive an actuating voltage and is completely outside a tilting area on the substrate defined by the optical element for at least some portion of a range of rotation of the optical element.

8. The optical crossconnect of claim 7 further comprising an array of input ports and an associated first array of MEMS actuators and an array of output ports and an associated second array of MEMS actuators, wherein the first array of MEMS actuators is adapted to controllably direct an optical signal incident on an optical element in the first array from an input port to the second array of MEMS actuators and the second array of MEMS actuators is configured to direct an optical signal incident on an optical element in the array to an output port.

9. A micro-electrical-mechanical system (MEMS) actuator comprising:

an actuated element rotatably coupled to a support structure wherein the support structure supports the actuated element in a plane above the plane of a surface of an underlying substrate and wherein the portion of the surface of the underlying substrate directly underlying the actuated element defines a tilting area on the underlying substrate; an electrode formed on the surface of the underlying substrate, wherein the electrode is configured to cause the actuated element to rotate when an electrical potential is supplied to the electrode and wherein the electrode has at least three components, a first component and a third component that are adapted to receive an actuating voltage and a second component that is adapted to be at an electrical potential that is substantially the same as the electrical potential of the actuated element, wherein the first and second components are at least partially within the tilting area of the actuated element, the third component is completely outside the tilting area of the actuated element for at least some portion of a range of rotation for the optical element and the second component is interposed between the first and third components.

10. The device of claim 9 wherein the actuated device is a mirror.

11. The device of claim 10 wherein the actuated device is a probe.

12. The device of claim 9 wherein the second electrode and optical element are adapted to be at ground potential.

13. The device of claim 9 wherein the actuated element rotates through a range of angles, and the third electrode component is completely outside the tilting area of the actuated element throughout the range of angles.

14. The device of claim 9 wherein the actuated element is rotatably coupled to the support structure by at least two torsional members.

* * * * *